(12) United States Patent
Vaillant et al.

(10) Patent No.: US 8,786,708 B2
(45) Date of Patent: Jul. 22, 2014

(54) METHOD FOR CHARACTERIZING PIXELS OF AN IMAGE SENSOR

(75) Inventors: Jérôme Vaillant, Grenoble (FR); Thomas Decroux, Lumbin (FR); Clémence Mornet, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 155 days.

(21) Appl. No.: 13/305,562

(22) Filed: Nov. 28, 2011

(65) Prior Publication Data

US 2012/0147230 A1    Jun. 14, 2012

(30) Foreign Application Priority Data

Dec. 10, 2010    (FR) ...................................... 10 60337

(51) Int. Cl.
*H04N 17/00*        (2006.01)
*H04N 17/02*        (2006.01)

(52) U.S. Cl.
USPC .......................................... 348/187; 348/273

(58) Field of Classification Search
CPC ..... H04N 17/002; H04N 5/217; G06T 7/0018
USPC .................................. 348/187, 241, 272–280
See application file for complete search history.

(56) References Cited

U.S. PATENT DOCUMENTS

| | | |
|---|---|---|
| 7,400,352 B1 | 7/2008 | Luo |
| 7,456,878 B1 | 11/2008 | Sun et al. |
| 2005/0057655 A1 | 3/2005 | Duesman et al. |
| 2008/0068735 A1 * | 3/2008 | Goldsmith ..................... 359/891 |
| 2009/0140127 A1 * | 6/2009 | Lee et al. .................. 250/214 R |
| 2011/0134288 A1 * | 6/2011 | Kasai ............................ 348/241 |
| 2012/0098975 A1 * | 4/2012 | Chao et al. .................... 348/187 |

OTHER PUBLICATIONS

French Search Report and Written Opinion dated Jul. 5, 2011from corresponding French Application No. 10/60337.

* cited by examiner

*Primary Examiner* — Gevell Selby
(74) *Attorney, Agent, or Firm* — Wolf, Greenfield & Sacks, P.C.

(57) ABSTRACT

A method for characterizing image sensor pixels arranged in an array, including the steps of: (a) illuminating a first portion of the array formed of pixels associated with a color filter of a first color; (b) measuring the detection performed by a central pixel of the first portion; (c) illuminating a second portion of the array formed of a central pixel associated with a color filter of a second color and of peripheral pixels associated with a color filter of the first color; (d) measuring the detection performed by the central pixel and the peripheral pixels of the second portion; (e) comparing the measurements of steps (b) and (d).

13 Claims, 4 Drawing Sheets

METHOD FOR CHARACTERIZING PIXELS OF AN IMAGE SENSOR

CROSS REFERENCE TO RELATED APPLICATIONS

This application claims the priority benefit of French patent application number 10/60337, filed on Dec. 10, 2010, entitled METHOD FOR CHARACTERIZING PIXELS OF AN IMAGE SENSOR, which is hereby incorporated by reference to the maximum extent allowable by law.

BACKGROUND OF THE INVENTION

1. Field of the Invention

The present invention relates to a method for characterizing pixels of an image sensor and, more specifically, to a method for measuring the crosstalk between adjacent pixels, adapted to any type of image sensor pixels.

2. Discussion of Related Art

In an integrated image sensor, elementary photodetection cells, called pixels, are formed at the surface of a semiconductor substrate. Each pixel generally comprises an area where photogenerated charges are collected and elements for transferring these charges to an electronic circuit capable of processing this information.

The pixels of the pixel array are isolated from one another to limit as much as possible the capture by a neighboring pixel of photons or photogenerated charges intended for a given pixel (crosstalk).

When a new image sensor pixel structure is designed, a characterization of the sensor pixels is necessary to determine whether the operation of the new pixels is improved with respect to that of known pixels or to characterize other parameters of these pixels (dark currents, noise, saturation). It is generally provided to characterize the crosstalk between pixels.

Several techniques are known to perform such a characterization. It has, in particular, been provided to illuminate the device by means of a thin local beam capable of lighting a single pixel of the image sensor. The number of electrons detected by the pixels adjacent to the illuminated pixel is then measured. This enables to know the leakage of photogenerated charges from one pixel to the surrounding pixels, in all directions. This measurement is performed for several wavelengths, and for pixels topped with color filters of different colors.

However, the method cannot work when the pixel size becomes very small. Indeed, in this case, the illumination of a single pixel becomes difficult, or even impossible, and cannot be performed without causing diffraction phenomena which prevent a proper characterization of the pixels.

A method for characterizing an image sensor pixel compatible with small pixels and representative of the normal operation of this pixel is thus needed.

SUMMARY OF THE INVENTION

An object of an embodiment is to provide a method for characterizing an image sensor pixel adapted to any image sensor type and to any pixel size.

Another object of an embodiment is to provide such a method representative of the real operation of the pixel.

Another object of an embodiment is to further provide a test image sensor providing a characterization of the image sensor pixels.

Thus, an embodiment provides a method for characterizing image sensor pixels arranged in an array, comprising the steps of: (a) illuminating a first portion of the array formed of pixels associated with a color filter of a first color; (b) measuring the detection performed by a central pixel of the first portion; (c) illuminating a second portion of the array formed of a central pixel associated with a color filter of a second color and of peripheral pixels associated with a color filter of the first color; (d) measuring the detection performed by the central pixel and the peripheral pixels of the second portion; (e) comparing the measurements of steps (b) and (d).

According to an embodiment, steps (a) to (e) are repeated for different pairs of color filters.

According to an embodiment, the measurements of steps (b) and (d) are performed for illuminations of the first and second portions of variable wavelengths.

According to an embodiment, in the second portion of the array, the peripheral pixels form a two-pixel wide ring around the central pixel.

According to an embodiment, steps (a) and (c) are carried out simultaneously and steps (b) and (d) are carried out simultaneously.

According to an embodiment, step (e) comprises comparing the measurement of step (b) with the measurement of step (d) performed by a pixel directly adjacent to the central pixel of the second portion, to determine the crosstalk between adjacent pixels associated with filters of the first and of the second colors in different directions of the array.

According to an embodiment, step (e) comprises comparing the measurement of step (b) with the measurement of step (d) performed by the central pixel of the second portion.

An embodiment further provides a test sensor formed of a pixel array comprising first portions in which the pixels are associated with a color filter of a first color and second portions in which a central pixel, associated with a color filter of a second color, is surrounded with peripheral pixels associated with a color filter of the first color.

According to an embodiment, the second portions comprise a central pixel surrounded with a two-pixel wide strip of peripheral pixels.

According to an embodiment, the color filter of the first color is a filter formed of a black resin.

The foregoing and other objects, features, and advantages will be discussed in detail in the following non-limiting description of specific embodiments in connection with the accompanying drawings.

BRIEF DESCRIPTION OF THE DRAWINGS

For clarity, the same elements have been designated with the same reference numerals in the different drawings and, further, as usual in the representation of integrated image sensors, the various drawings are not to scale.

DETAILED DESCRIPTION

To characterize an image sensor pixel, an opaque mask in which an opening is formed opposite to an isolated pixel could be formed at the surface of the photosensitive areas of the image sensor, after which the device could be illuminated at different wavelengths.

Figure 1:
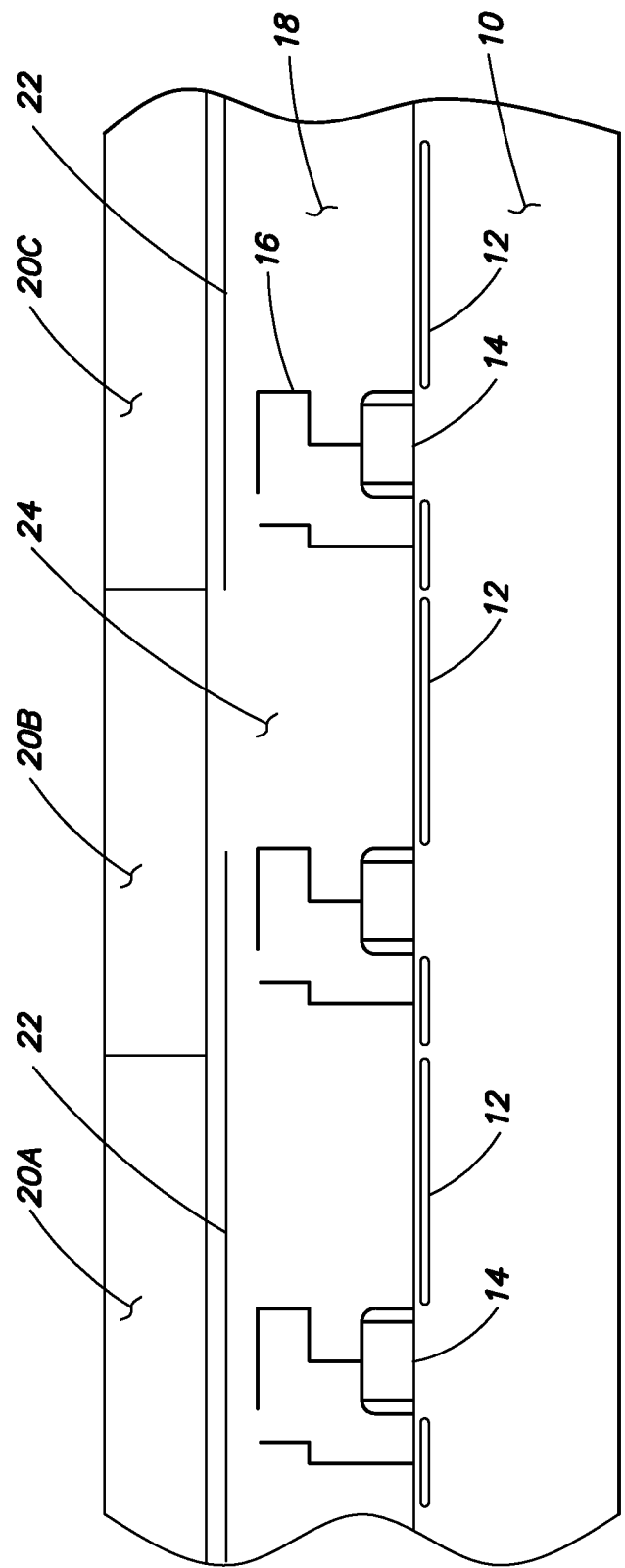
FIG. 1 illustrates a method for characterizing pixels of an image sensor.

FIG. 1 illustrates such a method, in the case of a front-illuminated image sensor.

The device comprises a substrate 10 having charge collection elements 12 and charge transfer elements, for example, MOS transistors 14, formed at its surface. The association of a photogeneration element, of a collection element, and of a charge transfer element forms a pixel.

A stack of interconnection levels comprising conductive tracks 16 for connecting the different elements together and to the outside, separated by an insulating material 18, is provided at the surface of these elements. Color filters 20A, 20B, 20C enabling to form a color image sensor are formed at the surface of the interconnection stack, opposite to each pixel.

Generally, the color filters formed at the surface of a pixel array are distributed according to a Bayer pattern: each set of two by two pixels comprises two pixels topped with a green color filter, a pixel topped with a red color filter, and a pixel topped with a blue color filter. Such a configuration is particularly adapted to the detection of light beams in the visible range.

To characterize a pixel of this image sensor, a metallic opaque layer 22 is formed in an unused interconnection level of the stack of interconnection levels, that is, in insulating material 18. Opaque layer 22 comprises an opening 24 opposite to a photosensitive region of a single pixel. The device is then illuminated, and only the pixel opposite to opening 24 receives incident photons. Determining the amount of electrons received by the pixels surrounding the illuminated pixel enables to determine the crosstalk of this pixel in the different directions.

However, the presence of mask 22 on the device does not enable to satisfactorily characterize the pixel. Indeed, the use of mask 22 implies that the structure used for the characterization is not the true image of the final structure: mask 22 itself may cause interferences and modify the electric behavior of the pixel by adding stray capacitances thereto.

Thus, a device such as that in FIG. 1 does not enable to characterize the behavior of a pixel from which opaque layer 22 is absent. Further, such a characterization may also be disturbed by diffraction phenomena when the pixel size decreases below a given threshold, and requires an available interconnection level. This solution also has the disadvantage of only being compatible with front-illuminated image sensors.

To overcome the disadvantages of prior art and of the above method, a new method for characterizing pixels of an image sensor adapted to any image sensor pixel structure, be it for example, a front-illuminated image sensor or a back-illuminated image sensor, is provided.

In the following description, terms "red", "green" or "blue" pixel will be used to designate a pixel associated with a color filter of this color.

The provided characterization follows the following principle. In an image sensor, color filters of different colors are arranged in a specific manner. To characterize pixels, it is provided to form a test image sensor comprising various arrangements of color filters representative of the final arrangement of the color filters with respect to one another.

It may, for example, be provided to form, in a first portion of the test image sensor, an assembly of pixels topped with a same first color filter, the signal received by a central pixel of this pixel assembly forming a detection reference for the considered color. Indeed, the response of this pixel has a limited crosstalk since the signal lost towards surrounding pixels is at least partly compensated for by the signal originating therefrom.

In a second portion of the image sensor, it is provided to form an isolated pixel topped with a second color filter, the adjacent pixels being topped with a color filter of the color of the first color filter. The response of these adjacent pixels is then examined according to the wavelength of the incident lighting, and the influence of the isolated pixel of different color on the surrounding pixels is determined by comparison with the acquisition performed in the first portion of the image sensor.

To obtain a characterization of all the pixels and for all the wavelengths intended to be detected, structures such as those described hereabove are formed for different colors of color filters. The behavior of the pixels in a real configuration, for example, where the color filters are arranged in a Bayer pattern, can then be determined. This method will be described in detail hereafter.

FIGS. 2A, 2B, 3A, and 3B are top views of distributions of color filters in different portions of a pixel array of a test image sensor according to the above principle. Each portion comprises, as an example, a block of five pixels by five pixels. In these drawings, only the color filters are shown, knowing that any type of image sensor pixel may be formed opposite to these color filters.

Figure 2A:
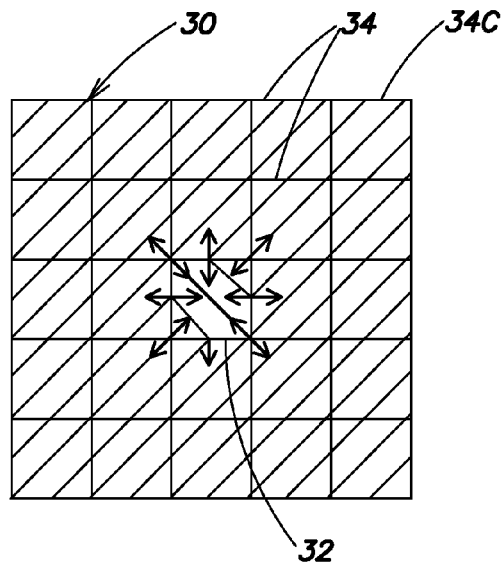
FIGS. 2A, 2B, 3A, and 3B illustrate, in top view, color filter configurations that may be used in a method according to an embodiment.
Figure 2B:
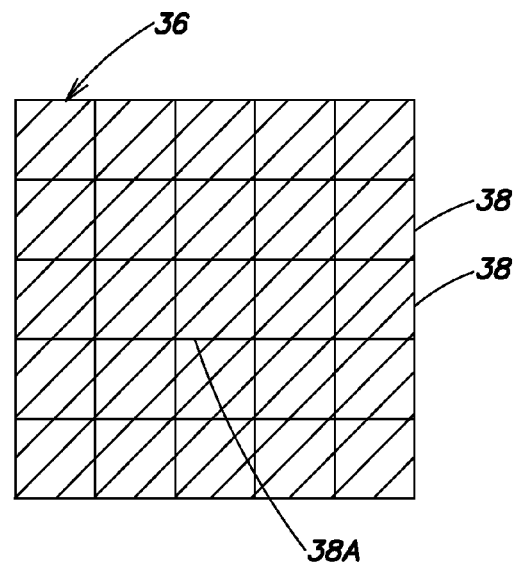

In FIG. 2A, a first portion 30 of the pixel array comprises a central pixel 32 of a first color (topped with a color filter of a first color), for example, blue. The other pixels 34 of first portion 30 are pixels of a second color, for example, red. In FIG. 2B, pixels 38 of a second portion 36 all are pixels of the second color, in the present example, red.

Central pixel 38A of the second portion is a reference pixel for red. Indeed, when it is illuminated by a light beam of variable wavelength, pixel 38A has a maximum detection for red since it detects light rays directed towards it as well as light rays arriving from the surrounding red pixels by crosstalk.

Figure 3A:
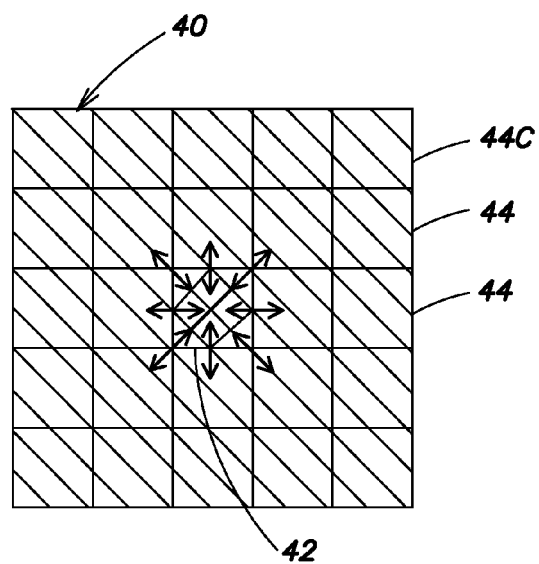
Figure 3B:
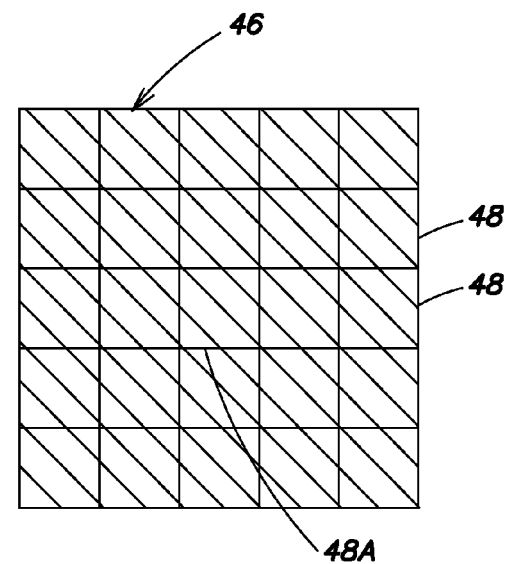

In FIG. 3A, a third portion 40 of the pixel array comprises a central pixel 42 of a third color, for example, green. The other pixels 44 of the third portion 40 are pixels of the first color, that is, blue. In FIG. 3B, pixels 48 of a fourth portion 46 all are pixels of the first color, in the present example, blue.

Central pixel 48A of the fourth portion is a reference pixel for blue. Indeed, it detects blue light rays directed towards it as well as light rays arriving from the surrounding blue pixels by crosstalk.

Similarly, additional portions, in which all pixels are green pixels, and other associations comprising a pixel of a color surrounded with pixels of another color, are provided in the pixel array.

It should be noted that the reference detection of pixels 38A, respectively 48A, surrounded with pixels of a same color, may also be obtained by analyzing the detection of a pixel 34C, respectively 44C, at one of the corners of structure 30 of FIG. 2A, respectively 40 of FIG. 3A, if it is close to other structures 30, respectively 40. Pixels are thus spared at the surface of the array. In all cases, a reference pixel 38A or 48A is surrounded with pixels of same color as this reference pixel.

Figure 4:
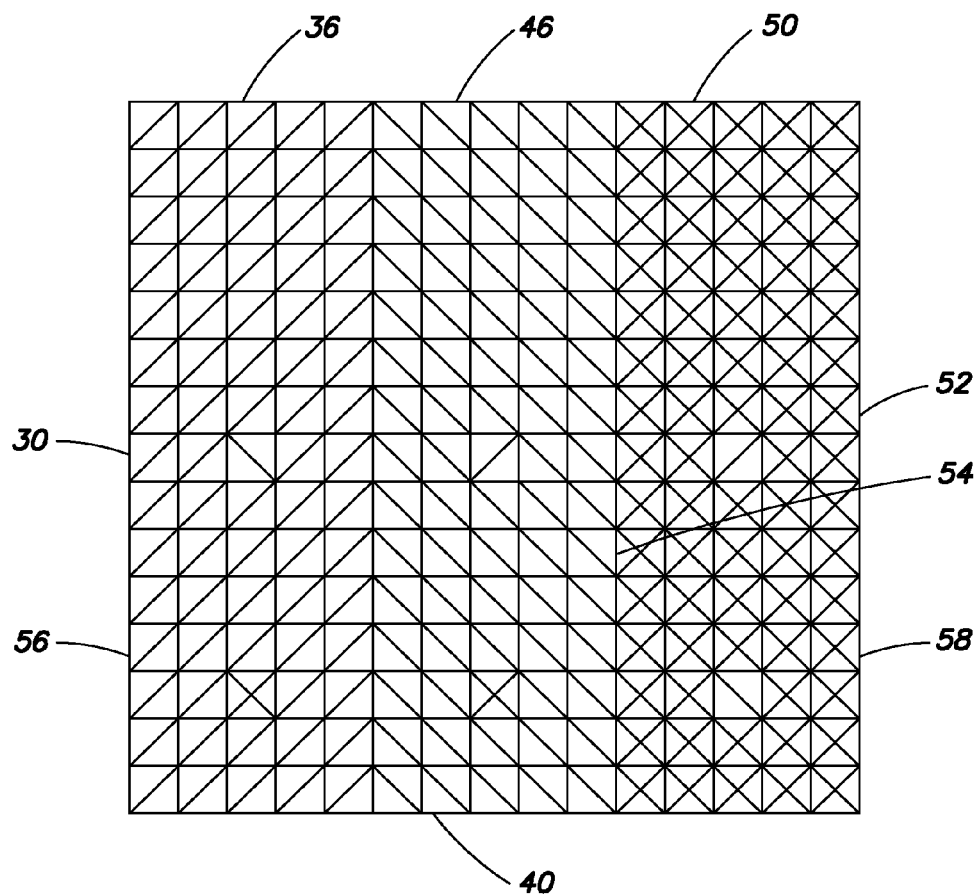
FIG. 4 illustrates, in top view, an example of a portion of an image sensor array that may be used in a method according to an embodiment and forming a portion of a test image sensor according to an embodiment.

A more general example of color pixel distribution in a test pixel array is illustrated in FIG. 4.

The shown arrangement discloses portions 30, 36, 40, and 46 of FIGS. 2A, 2B, 3A, and 3B. Other image sensor portions are provided: a portion 50 comprising twenty-five green pixels, a portion 52 comprising a red pixel surrounded with green pixels, a portion 54 comprising a red pixel surrounded with blue pixels, a portion 56 comprising a green pixel surrounded with red pixels, and a portion 58 comprising a blue pixel surrounded with green pixels.

The structure of FIG. 4 is particularly suited to determining the crosstalk of real pixels in an arrangement such as a Bayer pattern, or any pattern involving blue, red, and green pixels. Portions 36, 46, and 50 provide reference acquisitions (which may also be obtained in other locations of the array, if desired) and the other portions enable to determine the influence of a pixel of a color on surrounding pixels of another color, in all directions.

It should be noted that, on a test wafer capable of characterizing pixels, several structures such as that in FIG. 4 may be formed to obtain an average value for acquisitions performed by identical portions.

The device of FIG. 4, or any other device comprising associations of pixels of other colors used in an image sensor, is then illuminated by a light beam of variable wavelength and the responses of the different pixels of the device of FIG. 4 according to the wavelength (spectral response) are detected. By comparing the different configurations, information relative to the crosstalk between pixels of different colors can be obtained in all pixel directions.

Figure 5:
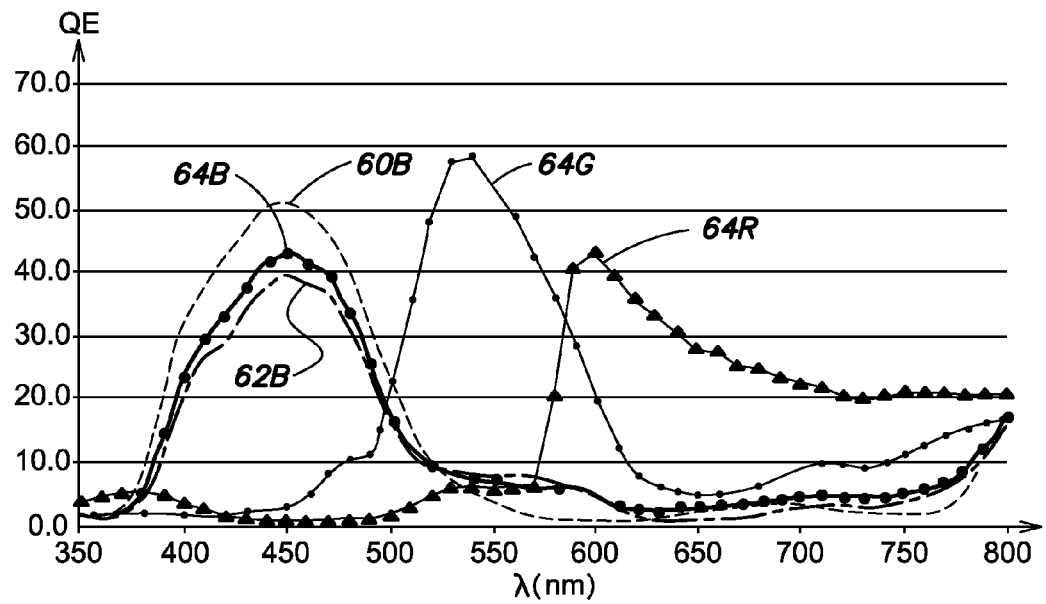
FIGS. 5 and 6 illustrate two curves obtained by means of a method according to an embodiment.
Figure 6:
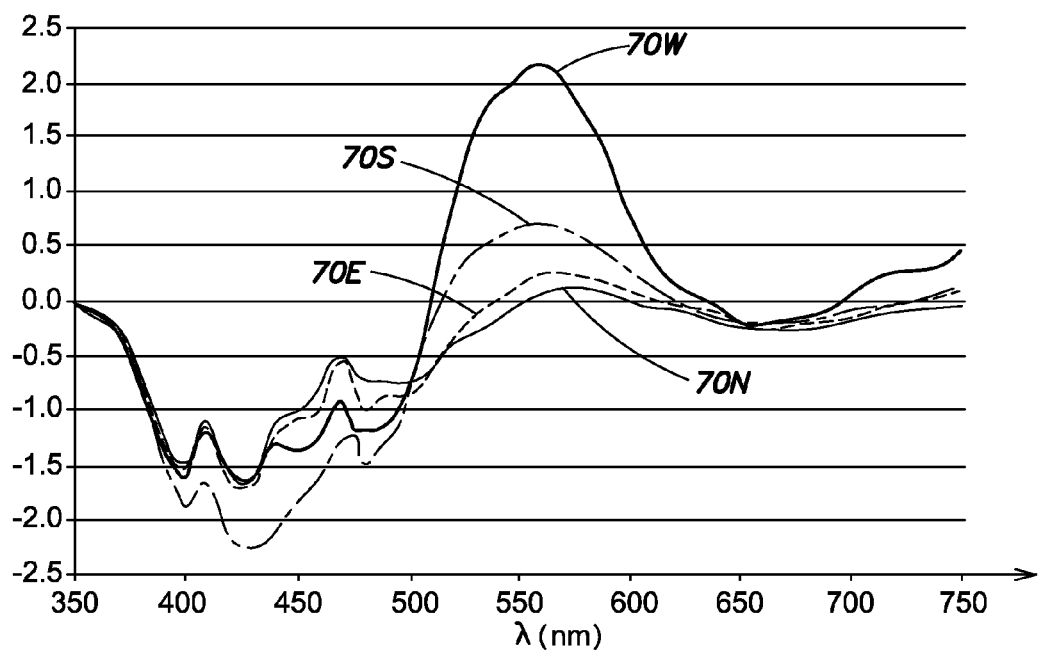

FIGS. 5 and 6 are curves obtained by means of a test device such as that in FIG. 4, for wavelengths in the visible range.

FIG. 5 shows curves of the response, according to the wavelength, for different pixel configurations. Such quantum efficiency curves (QE) show the quantity of photogenerated electrons with respect to a quantity of incident photons and are expressed in percents.

Curve 60B is obtained for a blue pixel surrounded with blue pixels (for example, pixel 48A in FIG. 3B). This curve, which is maximum for blue, can be used as a reference to determine the crosstalk between neighboring pixels. Curve 60B exhibits a main peak for a wavelength of approximately 450 nm and a very low detection of green and red.

Curve 62B corresponds to the detection of a blue pixel surrounded with green pixels, such as for example, the central pixel of portion 58. It should be noted, on this curve, that the detection of blue light beams is less efficient than in the case of a pixel surrounded with blue pixels. This is explained by the fact that part of the information of the blue pixel leaks towards the surrounding green pixels by crosstalk. Similarly, for wavelengths close to green, a blue pixel surrounded with green pixels receives photogenerated electrons from the adjacent pixels which are detected on the curve for wavelengths of approximately 500-550 nm.

Curves 64B, 64G, and 64R, correspond to the respective detection of blue, green, and red pixels formed in a Bayer pattern. Thus, curve 64B corresponds to the detection of a blue pixel directly surrounded with four green pixels and diagonally surrounded with four red pixels. In this case, it should be noted that the loss of information from the blue pixel towards the surrounding pixels for blue light beams is less significant than in the case where the blue pixel is only surrounded with green pixels, and that the blue pixel is sensitive to green and red light beams (electrons leaking from the neighboring pixels). This curve is shown as a comparison only and relates to a specific pixel structure.

When a pixel is isolated by being surrounded with pixels of different colors, information may be obtained both from the central pixel, to know the amount of information that it loses towards the surrounding pixels, or again from the adjacent pixels, to know the influence of a pixel of different color in the different directions of the pixel array.

FIG. 6 illustrates curves obtained after a processing of the information provided by central pixels of portions such as portions 36, 46, or 50 and of the information of pixels adjacent to the central pixels of portions 30, 54, 52, 56, 40 or 58.

FIG. 6 shows the influence of an isolated green pixel on adjacent blue pixels according to the positioning of these pixels. These curves are obtained by calculating the difference between the spectrum of a blue pixel next to an isolated green pixel in different directions (corresponding to a blue pixel next to an isolated green pixel of a portion 40) and the spectrum of a blue pixel surrounded with blue pixels (the central pixel of portion 46, for example).

Curve 70N illustrates the influence of a blue pixel on a green pixel when the green pixel is placed above the blue pixel in the drawings, which will be called the North direction hereafter (the direction is arbitrarily defined), of the green pixel. Curves 70S, 70W, and 70E respectively illustrate the influence of a blue pixel on a green pixel when the green pixel is placed in the South direction, in the West direction, and in the East direction.

It should be noted that the different curves do not overlap. This is due to the very structure of the pixel, which tends to leak in certain directions more than in others, according to the wavelength of the incident light beam.

These different curves show that a blue pixel tends to leak towards the adjacent pixels when it is illuminated by a blue beam (wavelength below 500 nm, negative curve). Photogenerated electrons normally intended for the blue pixel leak towards the surrounding pixels, more or less according to the relative positioning of these pixels. Conversely, when the structure comprising a green pixel surrounded with blue pixels is illuminated by a green light beam, the pixel tends to leak towards blue pixels and the latter detect a signal that they should not be receiving.

The shape of curves such as hereabove, with associations of color filters positioned in different manners, thus enable to quantify the crosstalk between each pixel association, for a predetermined wavelength spectrum. The analysis of these curves in relation with the shape of the final pixel arrangement enables to identify weak points of the pixels in specific directions. The behavior of a sensor can also be predicted when it is in normal operation, for example, topped with a Bayer pattern in the case of a conventional color image sensor, by combining the information of the different curves by means of an adapted computer program.

For the characterization of an isolated pixel (portions 30, 54, 52, 56, 40, and 58 in FIG. 4) to be as accurate as possible and free of parasitic detection, this pixel should be isolated from other pixels capable of involving crosstalk. The present inventors have determined that an isolation by a strip which is more than two pixel wide enables to avoid for the detection of a pixel to be disturbed by other adjacent pixels.

However, for the characterization to be as representative as possible of the real sensor operation (once integrated, for example, in a Bayer pattern), a maximum distance between this pixel and pixels of the same type located in the array must be respected so that the color filter structures are substantially the same as in normal operation. Indeed, in the forming of color filters on a pixel array, for example, formed according to a Bayer pattern, the color filters are formed in front of the pixels one after the other. This results in an overlapping and a slight thickness difference of the color filters above the pixel contours. To properly characterize an isolated pixel, it is thus necessary to provide a structure close to that in which the pixel will be in real conditions.

In the case of current image sensor technologies, the present inventors have determined that an isolation of a pixel of a color by a peripheral ring having a width corresponding to two pixels is well adapted to an accurate characterization of the pixel and is representative of the pixel behavior in real operation. It should be noted that, for other technologies, a different pixel isolation may be used. Thus, preferably, when it is provided to isolate a pixel with pixels of another color, these pixels will be formed around the isolated pixel over a two-pixel width.

Advantageously, the characterization method provided herein is adapted to the characterization of any type of image sensor, for example, a front-illuminated or back-illuminated image sensor. Further, this method is adapted to any pixel configuration since the characterization is performed on real pixels formed on a test plate. This method also has the advantage of implying no modification of the device for the characterization.

Specific embodiments of the present invention have been described. Various alterations, modifications, and improvements will occur to those skilled in the art. In particular, a method using conventional color filters, that is, blue, red, and green filters, has been disclosed herein. It should be noted that it may also be provided for the color filters to be of other colors, according to the desired application of the image sensor. It may also be provided to use, instead of a colored resin, a black resin masking the arrival of some photons, in the characterization method. This configuration, although less representative of real systems in which the pixels are alternately covered with different color filters, may be used to characterize a pixel isolated from its environment or again to determined its dark current if a black resin mask is formed over an assembly of adjacent pixels.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for characterizing image sensor pixels arranged in an array, comprising the steps of:
    (a) illuminating a first portion of the array formed of pixels associated with a color filter of a first color;
    (b) measuring a response by a central pixel of the first portion;
    (c) illuminating a second portion of the array formed of a central pixel associated with a color filter of a second color and of peripheral pixels associated with a color filter of the first color;
    (d) measuring responses by the central pixel and the peripheral pixels of the second portion;
    (e) comparing the response by the central pixel of the first portion of the array and the responses by the central pixel and the peripheral pixels of the second portion of said array; and
    (f) outputting data indicative of a characterization of crosstalk between the central pixel and at least one peripheral pixel of the second portion based at least in part on a result of step (e).

2. The method of claim 1, wherein steps (a) to (e) are repeated for different pairs of color filters.

3. The method of claim 1, wherein the measurements of steps (b) and (d) are performed for illuminations of the first and second portions of variable wavelengths.

4. The method of claim 1, wherein, in the second portion the peripheral pixels form a two-pixel wide ring around the central pixel.

5. The method of claim 1, wherein steps (a) and (c) are carried out simultaneously and steps (b) and (d) are carried out simultaneously.

6. The method of claim 1, wherein step (e) comprises comparing the measurement of step (b) with the measurement of step (d) performed by a pixel directly adjacent to the central pixel of the second portion to determine the crosstalk between adjacent pixels associated with filters of the first and of the second colors in different directions of the array.

7. The method of claim 1, wherein step (e) comprises comparing the measurement of step (b) with the measurement of step (d) performed by the central pixel of the second portion.

8. A method for characterizing image sensor pixels in an array of image sensor pixels, comprising:
    illuminating a first pixel area of the array, the first pixel area formed of pixels wherein each pixel includes a color filter of a first color;
    measuring a response of a first central pixel of the first pixel area to the illumination of the first pixel area;
    illuminating a second pixel area of the array, the second pixel area formed of pixels wherein a second central pixel includes a color filter of a second color and pixels surrounding the second central pixel include a color filter of the first color;
    measuring responses of the second central pixel and at least one of the pixels surrounding the second central pixel to the illumination of the second pixel area;
    comparing the measured responses of the first pixel area and the second pixel area; and
    outputting data indicative of a characterization of crosstalk between the second central pixel and the at least one of the pixels surrounding the second central pixel based at least in part on a result of the comparing.

9. A method for characterizing image sensor pixels as defined in claim 8, further comprising repeating the illuminating, the measuring and the comparing for different first and second pixel areas having different color filters.

10. A method for characterizing image sensor pixels as defined in claim 8, wherein illuminating the first pixel area and illuminating the second pixel area includes illuminating the first and second pixel areas with light of variable wavelengths.

11. A method for characterizing image sensor pixels as defined in claim 8, wherein each pixel area includes a central pixel surrounded by a two-pixel wide ring of pixels.

12. A method for characterizing image sensor pixels as defined in claim 8, wherein the first and second pixel areas each have dimensions of five by five pixels.

13. A method for characterizing image sensor pixels as defined in claim 8, wherein measuring responses of the pixels surrounding the second central pixel includes measuring responses of at least two of the pixels surrounding the second central pixel in different directions relative to the second central pixel to determine crosstalk between adjacent pixels in different directions of the array.

* * * * *